United States Patent
Pachouri

(10) Patent No.: US 9,641,509 B2
(45) Date of Patent: May 2, 2017

(54) ENTERPRISE AUTHENTICATION SERVER

(71) Applicant: CA, Inc., New York, NY (US)

(72) Inventor: Rajendra Kumar Pachouri, Bangalore (IN)

(73) Assignee: CA, INC., New York, NY (US)

( * ) Notice: Subject to any disclaimer, the term of this patent is extended or adjusted under 35 U.S.C. 154(b) by 0 days.

(21) Appl. No.: 14/813,868

(22) Filed: Jul. 30, 2015

(65) Prior Publication Data

US 2017/0034143 A1    Feb. 2, 2017

(51) Int. Cl.
H04L 29/06    (2006.01)

(52) U.S. Cl.
CPC .......... H04L 63/08 (2013.01); H04L 63/0807 (2013.01); H04L 63/0815 (2013.01); H04L 63/0884 (2013.01); H04L 67/42 (2013.01)

(58) Field of Classification Search
CPC ............. H04L 63/0807; H04L 63/0815; H04L 63/0884
See application file for complete search history.

(56) References Cited

U.S. PATENT DOCUMENTS

| | | | | |
|---|---|---|---|---|
| 8,214,635 B2* | 7/2012 | Wang | ................. | H04L 63/0464 713/156 |
| 8,332,920 B2* | 12/2012 | Kass | ....................... | G06F 21/33 709/203 |
| 8,478,989 B2 | 7/2013 | Lynch et al. | | |
| 8,639,628 B2 | 1/2014 | Popp | | |
| 9,148,285 B2* | 9/2015 | Chang | ................... | H04L 9/3213 |
| 9,306,943 B1* | 4/2016 | Bailey | ................. | H04L 63/0853 |
| 2003/0188193 A1* | 10/2003 | Venkataramappa | | H04L 63/0815 726/10 |
| 2004/0030918 A1* | 2/2004 | Karamchedu | ......... | G06F 21/606 726/3 |
| 2006/0174104 A1* | 8/2006 | Crichton | ................. | G06F 21/33 713/155 |
| 2006/0236382 A1* | 10/2006 | Hinton | ................ | H04L 63/0815 726/8 |
| 2007/0050635 A1* | 3/2007 | Popp | ..................... | H04L 9/0863 713/185 |

(Continued)

*Primary Examiner* — James Turchen
(74) *Attorney, Agent, or Firm* — Sage Patent Group

(57) ABSTRACT

In a computer-implemented authentication method, a first authentication request from a first machine is received at an authentication server. The first authentication request includes an identification of a second machine that is to provide a requested service. An authentication token including client-specific and server-specific portions is generated at the authentication server, responsive to receiving the first authentication request from the first machine. An authentication identifier and the server-specific portion of the authentication token are transmitted from the authentication server to the second machine, responsive to receiving the first authentication request from the first machine. A second authentication request, including the authentication identifier and both the server-specific and the client-specific portions of the authentication token, is received at the authentication server from the second machine. An authentication status for the requested service is determined at the authentication server, responsive to receiving the second authentication request from the second machine.

15 Claims, 6 Drawing Sheets

(56) References Cited

U.S. PATENT DOCUMENTS

| | | | | |
|---|---|---|---|---|
| 2010/0198730 A1* | 8/2010 | Ahmed | G06F 17/30528 | 705/50 |
| 2010/0268937 A1* | 10/2010 | Blom | H04L 63/061 | 713/153 |
| 2010/0325441 A1* | 12/2010 | Laurie | G06F 21/31 | 713/185 |
| 2012/0254957 A1* | 10/2012 | Fork | G06F 21/33 | 726/6 |
| 2013/0019295 A1* | 1/2013 | Park | H04L 9/3213 | 726/7 |
| 2015/0163222 A1* | 6/2015 | Pal | H04L 63/0807 | 713/168 |
| 2015/0278487 A1* | 10/2015 | Scott | G06F 21/10 | 726/28 |
| 2015/0288679 A1* | 10/2015 | Ben-Nun | H04L 67/141 | 726/10 |
| 2015/0319174 A1* | 11/2015 | Hayton | H04L 63/10 | 726/7 |
| 2016/0191526 A1* | 6/2016 | Panchapakesan | H04L 63/10 | 726/1 |

* cited by examiner

ENTERPRISE AUTHENTICATION SERVER

BACKGROUND

The present disclosure relates generally to electronic devices, and more particularly, to authentication of electronic devices.

Enterprises and/or cloud environments typically include multiple systems and subsystems, and many of the systems may be integrated with each other. Point-to-point authentication in such systems may thus become tightly coupled, which may introduce problems with respect to time scalability, maintainability, and/or cost. For example, as the various systems having different configurations in an enterprise and/or cloud environment may lack common audit and/or logging capabilities, system accountability may not be transparent. Furthermore, with increasing system size, point to point authentication may become increasingly more time consuming.

SUMMARY

Some embodiments of the present disclosure are directed to a computer-implemented authentication method in which a first authentication request from a first machine is received at an authentication server. The first authentication request includes an identification of a second machine that is to provide a requested service. An authentication token including client-specific and server-specific portions is generated at the authentication server, responsive to receiving the first authentication request from the first machine. An authentication identifier and the server-specific portion of the authentication token are transmitted from the authentication server to the second machine, responsive to receiving the first authentication request from the first machine. A second authentication request including the authentication identifier, the server-specific portion of the authentication token, and the client-specific portion of the authentication token is received at the authentication server from the second machine. An authentication status for the requested service is determined at the authentication server, responsive to receiving the second authentication request from the second machine. The operations of the computer-implemented method are performed by at least one processor of the authentication server.

In some embodiments, the client-specific portion of the authentication token may not be transmitted to the second machine from the authentication server.

In some embodiments, the authentication identifier and the client-specific portion of the authentication token may be transmitted from the authentication server to the first machine, responsive to receiving the first authentication request. The second authentication request may be received from the second machine responsive to transmitting the client-specific portion of the authentication token to the first machine.

In some embodiments, the server-specific portion of the authentication token may not be transmitted to the first machine from the authentication server.

In some embodiments, a third authentication request including the authentication identifier may be received at the authentication server from the first machine, responsive to determining the authentication status. An acknowledgment including the authentication status may be transmitted from the authentication server to the first machine, responsive to receiving the third authentication request.

In some embodiments, an authentication response including the authentication status may be transmitted from the authentication server to the second machine, responsive to the determining of the authentication status. The third authentication request may be received from the first machine responsive to transmitting the authentication response to the second machine.

In some embodiments, in determining the authentication status, the server-specific and the client-specific portions of the authentication token received from the second machine in the second authentication request may be compared with the authentication token generated at the authentication server responsive to receiving the first authentication request. The authentication status may be determined as positive responsive to a match indicated by the comparing, and the authentication status may be determined as negative responsive to an absence of a match indicated by the comparing.

In some embodiments, the acknowledgment including the authentication status as positive may indicate authorization for the first machine to accept a response for the requested service from the second machine. The authentication response including the authentication status as positive may indicate authorization for the second machine to provide the response for the requested service to the first machine.

Further embodiments of the present disclosure are directed to a computer system including a processor and a memory coupled to the processor. The memory includes computer readable program code embodied therein that, when executed by the processor, causes the processor to generate an authentication token having client-specific and server-specific portions, responsive to receiving a first authentication request from a first machine. The first authentication request includes an identification of a second machine that is to provide a requested service. The memory also includes computer readable program code embodied therein that, when executed by the processor, causes the processor to transmit, to the second machine, an authentication identifier and the server-specific portion of the authentication token, responsive to receiving the first authentication request from the first machine. The memory further includes computer readable program code embodied therein that, when executed by the processor, causes the processor to determine an authentication status for the requested service responsive to receiving, from the second machine, a second authentication request including the authentication identifier, the server-specific portion of the authentication token, and the client-specific portion of the authentication token.

Still further embodiments of the present disclosure are directed to a computer system including a computer readable storage medium having computer readable program code embodied in the medium. When executed by a processor, the computer readable program code causes the processor to generate an authentication token having client-specific and server-specific portions, responsive to receiving a first authentication request from a first machine. The first authentication request includes an identification of a second machine that is to provide a requested service. The computer readable program code, when executed, also causes the processor to transmit, to the second machine, an authentication identifier and the server-specific portion of the authentication token, responsive to receiving the first authentication request from the first machine. The computer readable program code, when executed, further causes the processor to determine an authentication status for the requested service responsive to receiving, from the second machine, a second authentication request including the authentication identifier, the server-specific portion of the authentication token, and the client-specific portion of the authentication token.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Other features of embodiments of the present disclosure will be more readily understood from the following detailed description of specific embodiments thereof when read in conjunction with the accompanying drawings, in which.

DETAILED DESCRIPTION

Figure 1A:
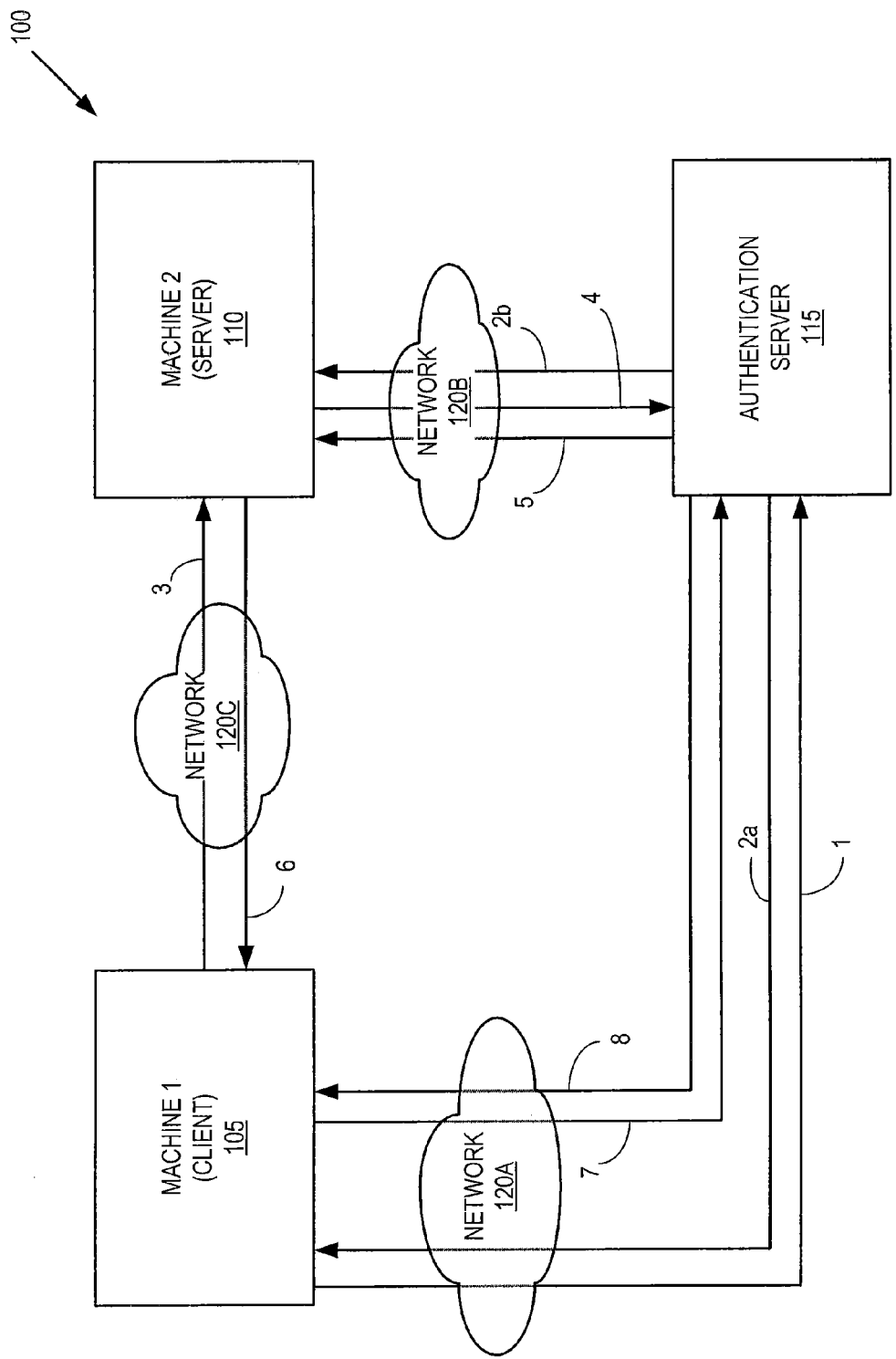
FIG. 1A is a block diagram of a computing system or environment in accordance with embodiments of the present disclosure.

Various embodiments will be described more fully hereinafter with reference to the accompanying drawings. Other embodiments may take many different forms and should not be construed as limited to the embodiments set forth herein. Like numbers refer to like elements throughout.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

As described herein, a computing system or environment may include one or more hosts, operating systems, peripherals, and/or applications. Machines in a same computing system or environment may have shared memory or resources, may be associated with the same or different hardware platforms, and/or may be located in the same (e.g., local) or different (e.g., remote) physical locations. Computing environments described herein may refer to a virtualized environment (such as a cloud environment) and/or a physical environment. Machines described herein may refer to physical machines or virtual machines (VMs), which may be managed by one or more virtual hypervisors in some embodiments.

Various embodiments of the present disclosure may arise from realization that, based on problems including system accountability, time scalability, maintainability, and/or cost, some conventional point-to-point authentication systems may benefit from an authentication server according to embodiments described herein, which can provide a less-complex configuration for system level authentication. In particular, the authentication server provides a common authentication mechanism for the systems in an enterprise and/or cloud environment, as well as an extra layer of security for the systems and subsystems, by utilizing a central registry for the machines in the environment. For a requested service, the authentication server thus provides a centralized solution (in contrast with separate ticket-granting and authentication servers) that directly communicates with and validates all involved parties (i.e., both the requesting client and the requested server), rather than only the requesting client. The authentication server can utilize randomly encrypted and randomly hashed token-based authentication, which can provide a stable, flexible, extensible, maintainable, and scalable solution, for both service-oriented architectures and the cloud.

Figure 1B:
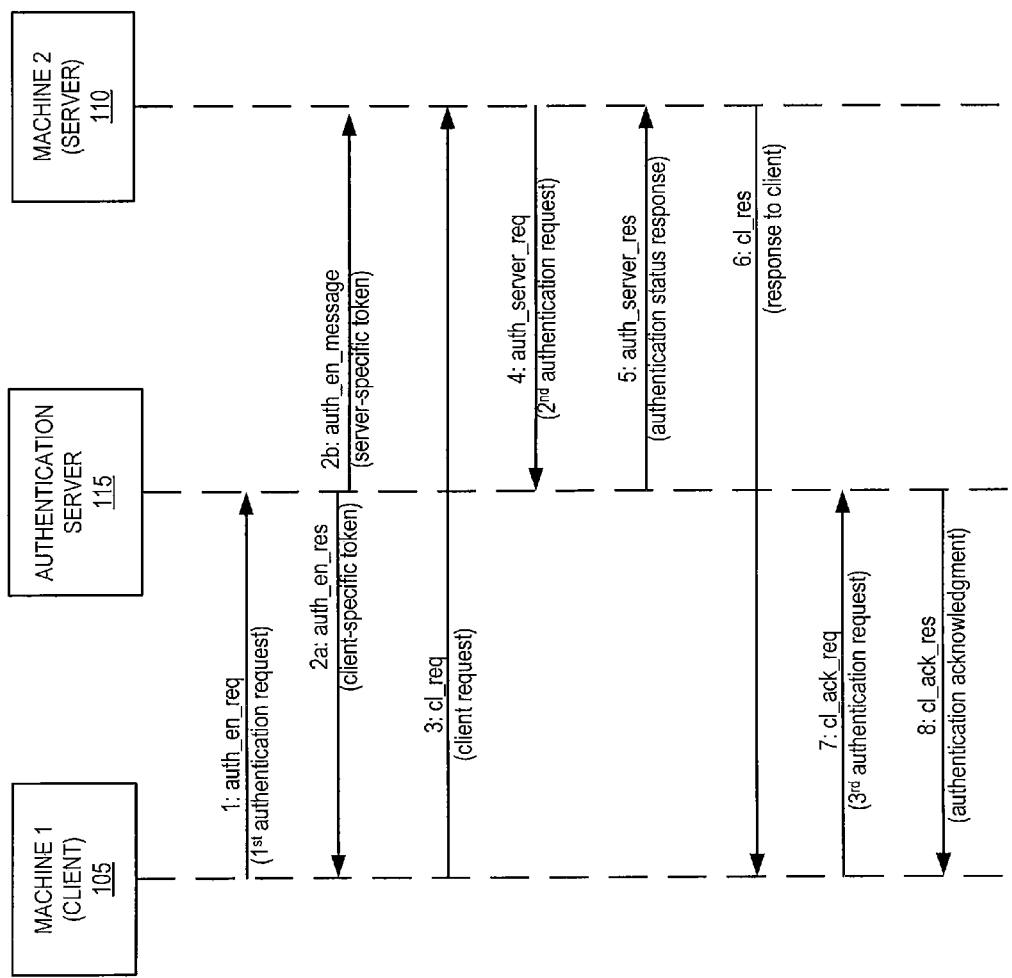
FIG. 1B is a flow diagram of operations performed by elements of a computing system or environment in accordance with embodiments of the present disclosure.

FIG. 1A is a block diagram illustrating a computing system or environment 100 in accordance with embodiments described herein, while FIG. 1B is a flow diagram illustrating operations performed by elements of a computing system or environment 100 in accordance with embodiments described herein.

Referring now to FIGS. 1A and 1B, a computing environment 100 (such as an enterprise and/or cloud environment) includes a plurality of computing machines (illustrated by way of example with reference to Machine 1 105 and Machine 2 110) and an authentication server 115 that are communicatively coupled via networks 120A, 120B, 120C. In some instances, the computing needs of users (e.g., humans and/or other virtual/non-virtual machines) may drive the functionality of the machines 105 and/or 110. In the example of FIGS. 1A and 1B, Machine 1 functions (and is referred to herein) as a client device 105 that is configured to request a service from Machine 2, which functions (and is referred to herein) as a server device 110 that is configured to provide the requested service. As described in greater detail herein, the authentication server 115 provides machine-to-machine authentication based on participation and communication between all involved parties (e.g., between the authentication server 115, the requesting client Machine 1 105, and the requested server Machine 2 110).

The networks 120A, 120B, 120C may be global networks, such as the Internet or other publicly accessible networks. Various elements of the networks 120A, 120B, 120C may be interconnected by a wide area network (WAN), a local area network (LAN), an Intranet, and/or other private network, which may not be accessible by the general public. Thus, the communication networks 120A, 120B, 120C may represent a combination of public and private networks or a virtual private network (VPN). The networks 120A, 120B, 120C may be a wireless network, a wireline network, or may be a combination of both wireless and wireline networks. Although illustrated as separate networks, it will be understood that the networks 120A, 120B, 120C may represent a common network in some embodiments. A such, the machines 105, 110 may communicate with one another and/or with the authentication server 115 by any conventional public and/or private, real and/or virtual wired and/or wireless network including all or a portion of the global communication network known as the Internet.

The computing system or environment can operate as follows to provide authentication for a requested service. The content of example requests, responses, and/or other messages 1-8 communicated between the machines 105, 110, and/or 115 illustrated in FIGS. 1A and 1B are shown in greater detail below with reference to Tables 1-8. Referring to FIGS. 1A and 1B, Machine 1 105 initiates a call or request for authentication by transmitting an initial or first authentication request 1 (auth_en_req) to the authentication server 115. As shown in Table 1, the first authentication request 1 includes an identification Machine 2 110, such as the IP address and/or hostname of Machine 2 110. The authentication server 115 checks to determine whether the first authentication request 1 is received from an IP address and/or hostname (i.e., that of Machine 1 105) that is registered with the authentication server 115, and to determine whether the IP address and/or hostname included in the first authentication request 1 (i.e., that of Machine 2 110) is registered with the authentication server 115. If Machine 1 105 is not registered, the authentication server 115 does not return a response. If Machine 1 105 is registered but Machine 2 110 is not registered, the authentication server 115 generates and returns a response only to Machine 1105.

If both Machine 1 105 and Machine 2 110 are registered, the authentication server 115 generates and returns respective responses to Machine 1 105 and Machine 2 110. In particular, in response to determining that Machine 1 105 and Machine 2 110 are registered based on the first authentication request 1, the authentication server 115 generates a unique authentication identifier for the requested service, and also a randomly encrypted authentication token. The authentication server 115 logically divides the authentication token into two parts, one that is specific to the requesting client device 105, and another that is specific to the requested server device 110. The authentication server 115 thus generates and transmits a response message 2a (auth_en_res) including the authentication identifier and the client-specific portion of the authentication token to Machine 1 105 (as shown in Table 2a), and generates and transmits a response message 2b (auth_en_message) including the authentication identifier and the server-specific portion of the authentication token to Machine 2 110 (as shown in Table 2b). Machine 1 105 and Machine 2 110 accept and/or consume the authentication identifier included in the messages 2a and 2b, respectively.

In some embodiments, symmetric key encryption/decryption may be used when the authentication server 115 exchanges information with the client machine 105 and the server machine 110. For example, the authentication server 115 and Machine 1 105 (client) may use an encryption key (key1) for communication, which is stored at the authentication server 115. Likewise, the authentication server 115 and Machine 2 110 (server) may use a different encryption key (key2) for communication, which is also stored at the authentication server 115. In some embodiments, the authentication server 115 may generate, store, and use one encryption key per machine, which is shared with respective machine. The authentication server-to-machine communication may use a common symmetric encryption algorithm, such as 3DES. The authentication server 115 may not exchange or otherwise share the respective encryption keys with any other machine in the environment 100.

As such, in some embodiments the authentication server 115 may use two levels of encryption/decryption, one for authentication server-to-machine communication, and another for generation of the randomly encrypted and/or randomly-hashed authentication token. The central authentication server 115 may be capable of configuring N number of cryptographic hash functions and M number of encryption algorithms. The authentication server 115 may store hash type (e.g., md5, SHA-1, SHA2, SHA-3 etc.) and encryption type (Twofish, Serpent, AES (Rijndael), Blowfish, CAST5, RC4, 3DES) for each authentication token. The authentication server 115 may generate a different encrypted authentication token for each received authentication request 1, and thus, the number of generated authentication tokens may be relatively large, depending on the database and/or specific application (e.g. oracle, mysql etc.). The number of symmetric encryption keys used by the authentication server 115 may be relatively smaller, as, for authentication server-to-machine communication, the number of symmetric keys depends on the number of machines in the environment 10 (e.g., for an environment 100 including 10 machines, the authentication server 115 will store 10 keys, one per machine).

Still referring to FIGS. 1A and 1B, in response to receiving the response message 2a (auth_en_res) from the authentication server 115, Machine 1 105 transmits a request or call 3 (cl_req) to Machine 2 110. As shown in Table 3, the request 3 from the client machine 105 includes the authentication identifier and the client-specific portion of the authentication token. Upon receipt of the request 3, Machine 2 110 checks for the authentication identifier, and, if it matches the authentication identifier received in the response message 2b, directs a request to the authentication server 115. In particular, Machine 2 transmits a subsequent or second authentication request 4 to the authentication server 115. As shown in Table 4, the second authentication request contains the authentication identifier (which was received in message 2b and message 3), the client-specific portion of the authentication token (which was received from the client machine 105 in message 3), and the server-specific portion of the authentication token (which was received from the authentication server 115 in message 2b).

The authentication server 115 compares the client-specific and server-specific portions of the authentication token received in the second authentication request 4 with the authentication token that was previously generated by the authentication server 115 for the received authentication identifier. The authentication server 115 determines and updates an authentication status for the requested service based on the comparison; if the comparison indicates a match, the authentication status is determined to be positive, while if the comparison does not indicate a match, the authentication status is determined to be negative. The authentication server 115 thus generates and transmits an authentication status response 5 (auth_server_res) to the server machine 110. The authentication status response 5 includes the authentication identifier and the determined authentication status, as shown in Table 5.

Responsive to receiving the authentication status response 5 from the authentication server 115, Machine 2 110 generates and transmits a server response 6 (cl_res) to Machine 1105. If the authentication status indicated in the authentication status response 5 (auth_server_res) is positive, the server response 6 includes the authentication identifier, as shown in Table 6, and/or other information relating to the requested service. If the authentication status indicated in the authentication status response 5 (auth_server_res) is negative, however, the server response 6 may include an error code.

Responsive to receiving the server response 6 from the requested server machine 110, Machine 1 105 determines whether to accept and/or consume the response 6 by generating and transmitting a verification or third authentication request 7 (cl_ack_req) to the authentication server 115. As shown in Table 7, the third authentication request 7 includes the authentication identifier, for example, because the client machine 105 may have outstanding authentication requests to multiple servers (and thus, may be associated by the authentication server 115 with multiple authentication identifiers). In other words, as Machine 1 105 may be associated with more than on authentication identifier at any given time, the presence of the authentication identifier in the third authentication request 7 ensures that the authentication server 115 responds with the authentication status corresponding to the correct service.

In particular, responsive to receiving the third authentication request 7, the authentication server 115 generates and transmits an authentication acknowledgment 8 (cl_ack_res) to the client machine 105. The authentication acknowledgment 8 includes the authentication identifier and the determined authentication status, as shown in Table 8. If the authentication status indicated in the authentication acknowledgment 8 is positive, Machine 1 105 accepts and/or consumes the server response 6. If the authentication status indicated in the authentication acknowledgment 8 is negative, Machine 1 105 does not accept and/or otherwise refuses to consume the server response 6. Thus, the client machine 105 transmits the third authentication request 7 to the authentication server 115 and uses the authentication acknowledgment 8 received therefrom as an additional or final check to ensure that the server response 6 from the server machine 110 is authentic. If the server response 6 is accepted, Machine 1 105 connects to Machine 2 110, for example, based on SSL or other mechanism, depending on the environment. Machine 1105, Machine 2, 110, and/or other machines in the environment 100 include respective configurations that require connection to the authentication server 115 with the initial authentication request 1 (for instance, via respective plug-ins that are configured to communicate with the authentication server), and the authentication server 115 is configured to maintain a list of all registered machines (for instance, by IP address/hostname) and accept requests from only registered machines.

TABLE 1

First Authentication Request from Client (auth_en_req)

| PARAM | VALUE |
| --- | --- |
| Hostname (Server) | <hostname> |
| Port number | <port> |
| Time stamp | <time> |
| Machine hostname(client) | <hostname> |

TABLE 2a

Authentication Server Response to Client (auth_en_res)

| PARAM | VALUE |
| --- | --- |
| Authentication ID | <symmetric encrypted value> |
| Authentication Token Client | <hashed and encrypted value> |
| Time stamp | <Time> |

TABLE 2b

Authentication Server Response to Server (auth_en_message)

| PARAM | VALUE |
| --- | --- |
| Authentication ID | <symmetric encrypted value> |
| Authentication Token Server | <hashed and encrypted value> |
| Time stamp | <Time> |

TABLE 3

Client http Request to Server (cl_req)

| PARAM | VALUE |
| --- | --- |
| Authentication ID | <symmetric encrypted value> |
| Authentication Token client | <hashed and encrypted value> |
| Time stamp | <Time> |

TABLE 4

Second Authentication Request from Server (auth_server_req)

| PARAM | VALUE |
| --- | --- |
| Authentication ID | <symmetric encrypted value> |
| Authentication Token Server | <hashed and encrypted value> |
| Authentication Token Client | <hashed and encrypted value> |
| Time stamp | <Time> |

TABLE 5

Authentication Status Response to Server (auth_server_res)

| PARAM | VALUE |
|---|---|
| Authentication ID | <symmetric encrypted value> |
| Authentication Status | Y, N, U |
| Time stamp | <Time> |

TABLE 6

Server http Response to Client (cl_res)

| PARAM | VALUE |
|---|---|
| Authentication ID | <symmetric encrypted value> |
| Time stamp | <Time> |

TABLE 7

Third Authentication Request from Client (cl_ack_req)

| PARAM | VALUE |
|---|---|
| Authentication ID | <symmetric encrypted value> |
| Time stamp | <Time> |

TABLE 8

Authentication Acknowledgment to Client (cl_ack_res)

| PARAM | VALUE |
|---|---|
| Authentication ID | <symmetric encrypted value> |
| Authentication Status | Y, N, U |
| Time stamp | <Time> |

The computing environment 100 can include any computing devices capable of implementing the machines 105, 110, and/or 115, which may include, without limitation, a mainframe computer platform, personal computer, mobile computer (e.g., tablet computer), server, wireless communication terminal (e.g., cellular data terminal), or any other appropriate program code processing device. One or more of the machines 105, 110, and/or 115 may include computer resources such as a processing circuit(s) (e.g., central processing unit, CPU); networking controllers; communication controllers; a display unit; a program and data storage device; memory controllers; input devices (such as a keyboard, a mouse, etc.) and output devices such as printers. The processing hardware may include circuit(s) configured to execute computer program code from memory device(s), described below as a computer readable storage medium, to perform at least some of the operations and methods described herein, and may be any conventional processor circuit(s), such as the AMD Athlon™ 64, or Intel® Core™ Duo. Although some embodiments of the machines 105, 110, and/or 115 are configured to operate as a computer server, the functionality of the machines 105, 110, and/or 115 is not limited thereto and can be configured to provide other functionality, such as data processing, communications routing, etc. Also, while illustrated in FIGS. 1A and 1B with reference to machines 105, 110, and/or 115 by way of example, it will be understood that additional machines, servers, systems, etc. may be included in the environment 100 and configured to carry out the operations described herein.

Figure 2:
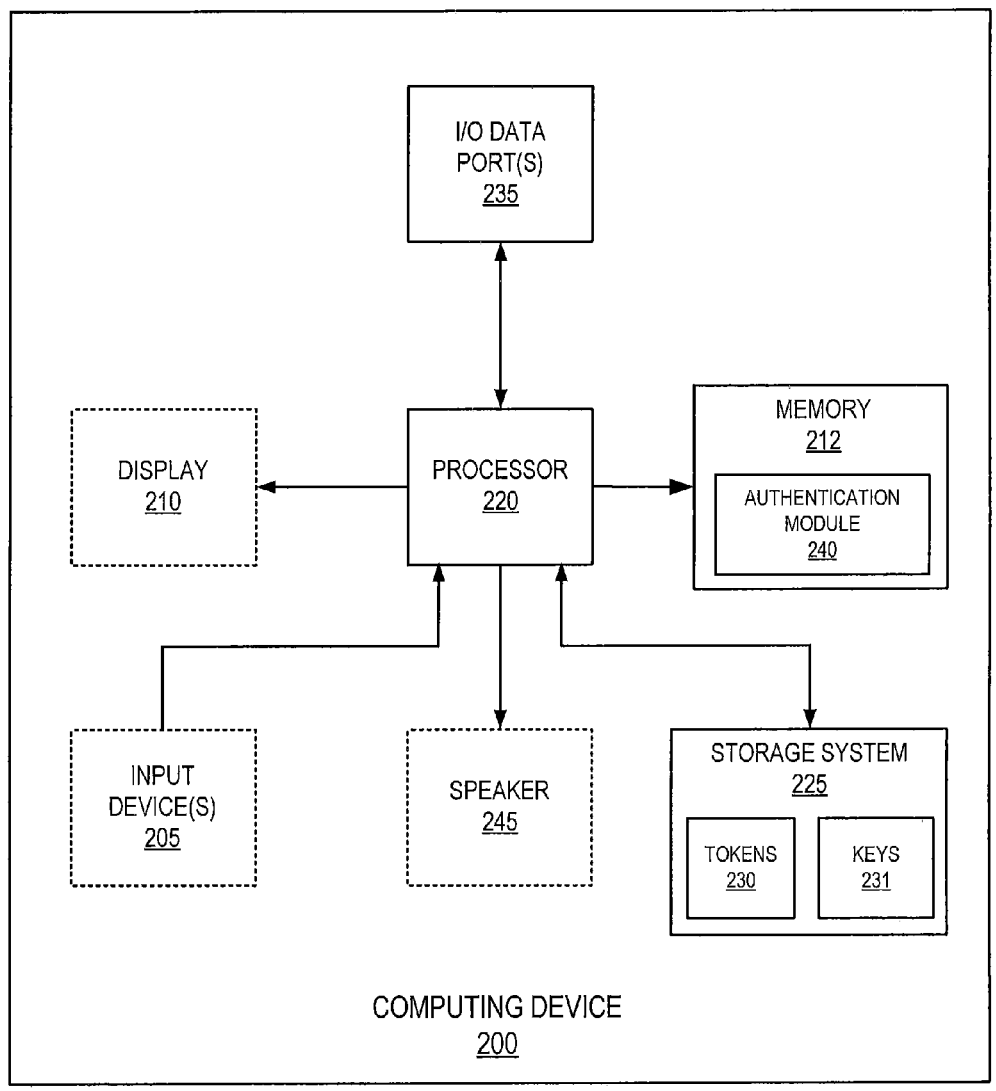
FIG. 2 is a block diagram of a computing device in accordance with embodiments of the present disclosure.

FIG. 2 illustrates an example computing device 200 in accordance with some embodiments of the present disclosure. The device 200 may be used, for example, to implement the authentication server 115 in the system 100 of FIGS. 1A-1B using hardware, software implemented with hardware, firmware, tangible computer-readable storage media having instructions stored thereon, or a combination thereof, and may be implemented in one or more computer systems or other processing systems. The computing device 200 may also be a virtualized instance of a computer. As such, the devices and methods described herein may be embodied in any combination of hardware and software.

As shown in FIG. 2, the computing device 200 may include input device(s) 205, such as a keyboard or keypad, a display 210, and a memory 212 that communicate with one or more processors 220 (generally referred to herein as "a processor"). The computing device 200 may further include a storage system 225, a speaker 245, and I/O data port(s) 235 that also communicate with the processor 220. The memory 212 may include an authentication module 240 installed therein. The authentication module 240 may be configured to determine an authentication status for a service requested by a client (such as Machine 1 105 of FIGS. 1A-1B), authorize a requested server (such as Machine 2 110 of FIGS. 1A-1B) to provide the requested service, and authorize the client to accept the requested service, as described herein.

The storage system 225 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The storage system 225 may store one or more authentication tokens 230 (for example, one per request/session) and one or more encryption keys 231 (for example, one per machine) generated by the authentication module 240, which may be accessed by the authentication module 240 to determine an authentication status for a requested service and indicate the authentication status to both the requesting client and the requested server, as described herein. Although illustrated in separate blocks, the memory 212 and the storage system 225 may be implemented by a same storage medium in some embodiments.

The input/output (I/O) data port(s) 235 may include a communication interface and may be used to transfer information in the form of signals between the computing device 200 and another computer system or a network (e.g., the Internet). The communication interface may include a modem, a network interface (such as an Ethernet card), a communications port, a PCMCIA slot and card, or the like. These components may be conventional components, such as those used in many conventional computing devices, and their functionality, with respect to conventional operations, is generally known to those skilled in the art. Communication infrastructure between the components of FIG. 2 may include one or more device interconnection buses such as Ethernet, Peripheral Component Interconnect (PCI), and the like.

Figure 3:
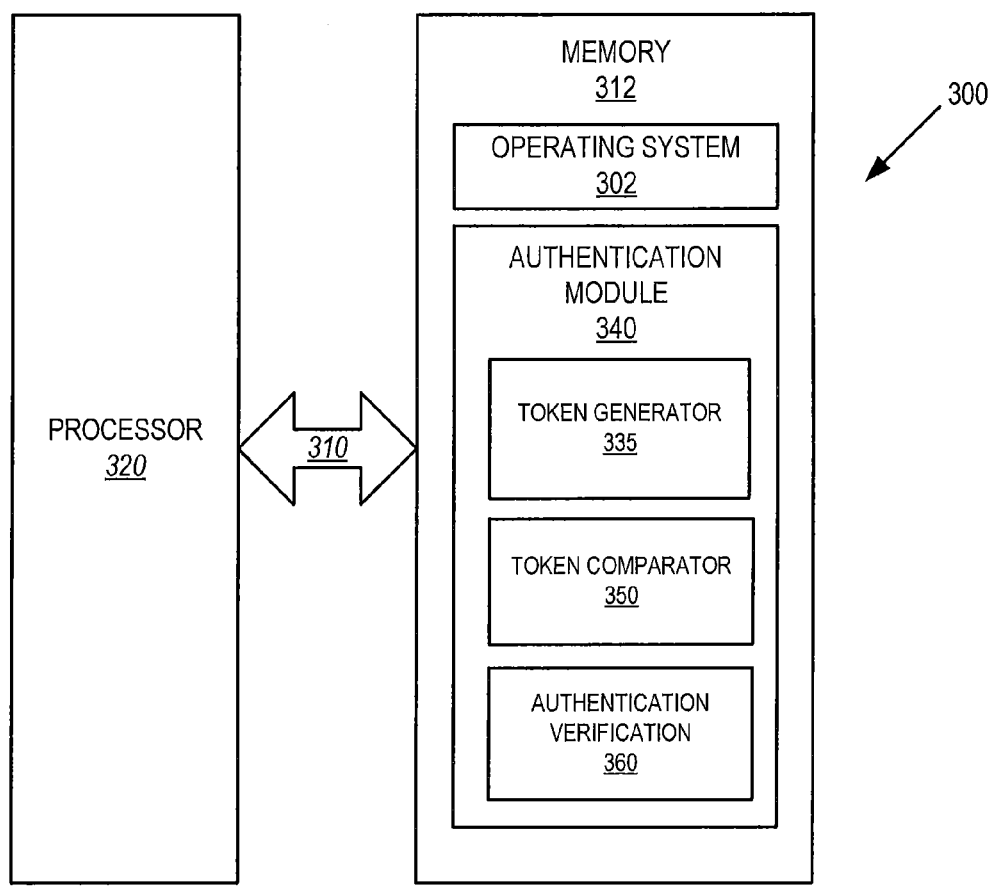
FIG. 3 is a block diagram that illustrates a software/hardware architecture of a server in accordance with embodiments of the present disclosure.

FIG. 3 illustrates a software/hardware architecture 300 for an authentication server in accordance with embodiments of the present disclosure. In particular, FIG. 3 illustrates a processor 320 and memory 312 that may be used in computing devices or other data processing systems, such as the computing device 200 of FIG. 2 and/or the authentication server 115 of FIG. 1. The processor 320 communicates with the memory 312 via an address/data bus 310. The processor 320 may be, for example, a commercially available or custom microprocessor, including, but not limited to, digital signal processor (DSP), field programmable gate array (FPGA), application specific integrated circuit (ASIC), and multi-core processors. The memory 312 may be a local storage medium representative of the one or more memory devices containing software and data in accordance with some embodiments of the present invention. The memory 312 may include, but is not limited to, the following types of devices: cache, ROM, PROM, EPROM, EEPROM, flash, SRAM, and DRAM.

As shown in FIG. 3, the memory 312 may contain multiple categories of software and/or data installed therein, including (but not limited to) an operating system block 302 and an authentication module block 340. The operating system 302 generally controls the operation of the computing device or server. For example, the operating system 302 may manage software and/or hardware resources and may coordinate execution of programs by the processor 320 in providing the functions of the authentication server 115 of FIG. 1. In particular, the authentication module 340 may be configured to provide instructions to the processor 320 that, when executed, carry out some or all of the functionality of the authentication server 115 of FIG. 1.

As such, the authentication module 340 includes a token generator function or module 335, a token comparator function or module 350, and an authentication verification function or module 360. The token generator 335 is configured to generate an authentication token in response to receiving an initial authentication request from a client device, such as Machine 1 105 of FIGS. 1A-1B. The token generator 335 is configured to divide or otherwise generate the authentication token to include a client-specific portion and a server-specific portion. The token generator 335 is configured to provide the client-specific portion of the authentication token for transmission to the client device (105 in FIGS. 1A-1B), and is configured to provide the server-specific portion of the authentication token for transmission to the server device (110 in FIGS. 1A-1B). However, the token generator 335 may be configured to prevent transmission of the client-specific portion of the authentication token to the server device 110, and/or to prevent transmission of the server-specific portion of the authentication token to the client device 105. The token generator 335 may also be configured to generate an authentication identifier corresponding to the initial authentication request, and provide the same for transmission to both the client device 105 and the server device 110.

Still referring to FIG. 3, the token comparator 350 is configured to compare information received in a subsequent authentication request from the requested server device 110 with the authentication token that was previously generated by the token generator 335. As noted above, the subsequent authentication request from the server device 110 may include both the client-specific and the server-specific portions of the authentication token. The results of the comparison are provided to the authentication verification module 360, which generates a positive or negative authentication status based on the results of the comparison, and provides the authentication status for transmission to both the client device 105 and the server device 110. In particular, if the client- and server-specific portions of the authentication token received in the subsequent authentication request match the authentication token that was generated by the token generator 335, the authentication verification module 360 generates a positive authentication status, which authorizes the server device 110 to provide and the client device 105 to accept the requested service. Conversely, if the information received in the subsequent authentication request does not match the authentication token generated by the token generator 335, the authentication verification module 360 generates a negative authentication status, which effectively instructs the server device 110 to indicate an error in the authentication process and the client device 105 to decline the requested service.

Computer program code for carrying out the operations discussed above with reference to FIGS. 1-3 may be written in a high-level programming language, such as COBOL, Python, Java, C, and/or C++, for development convenience. In addition, computer program code for carrying out operations of the present disclosure may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Authentication operations in accordance with some embodiments of the present disclosure will now be described with reference to the flowcharts of FIGS. 4 and 5. The operations described with reference to FIGS. 4 and 5 may be performed by the hardware/software architecture 300 of FIG. 3, the computing device 200 of FIG. 2, the authentication server 115 of FIG. 1, and/or elements thereof.

Figure 4:
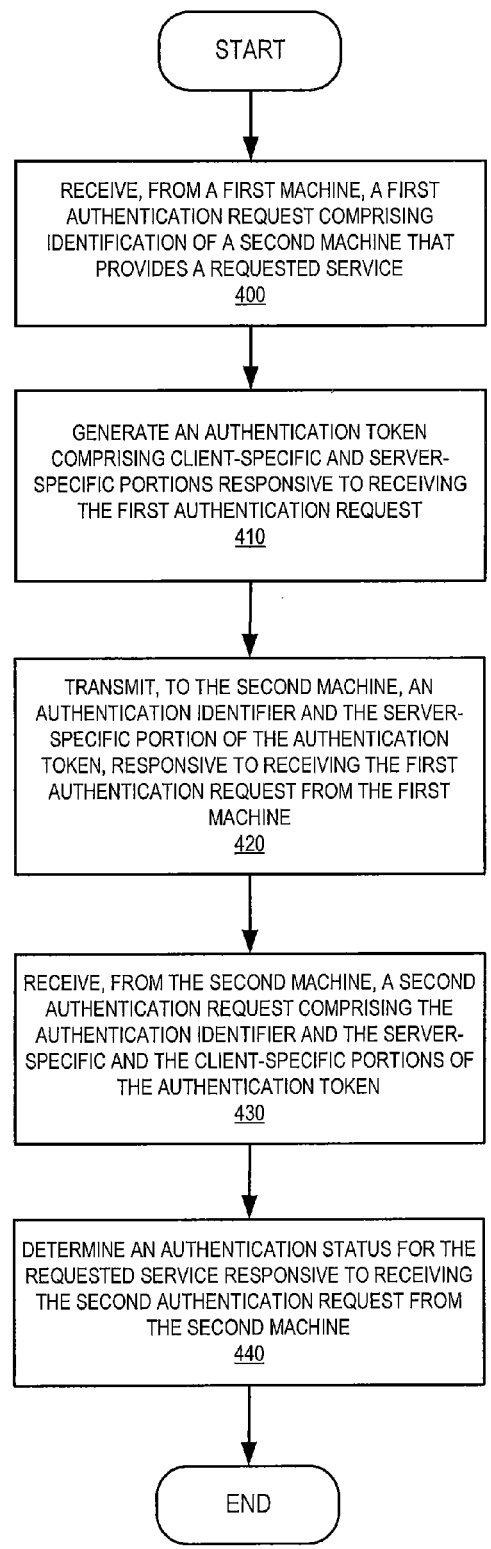
FIGS. 4-5 are flowcharts illustrating authentication methods in accordance with embodiments of the present disclosure.

Referring now to FIG. 4, operations begin at Block 400 where an initial or first authentication request from a first machine (such as the client machine 105 of FIG. 1) is received. The first authentication request includes an identification of a second machine (such as the server machine 110 of FIGS. 1A-1B), which is configured to provide a service that is requested by the first machine. In response to receiving the first authentication request, an authentication token is generated at Block 410. The authentication token includes a client-specific portion and a server-specific portion. For example, a randomly encrypted token may be generated, and the token may be divided into two parts, one specific to the requesting client, and one specific to the requested server. An authentication identifier (for example, a unique identifier corresponding to the authentication request) and the server-specific portion of the authentication token are transmitted to the second machine that provides the requested service at Block 420. The client-specific portion of the authentication token, however, is not transmitted to the second machine.

Still referring to FIG. 4, at Block 430, a subsequent or second authentication request is received from the second machine, responsive to the transmission of Block 420. The second authentication request includes the authentication identifier, the server-specific portion of the authentication token, and also the client-specific portion of the authentication token. The presence of the client-specific portion of the authentication token (which was not transmitted to the second machine by the authentication server) in the second authentication request may indicate communication between the first machine and the second machine.

In response to receiving the second authentication request from the second machine, an authentication status for the requested service is determined at Block 440. In particular, the server-specific and client-specific portions of the authentication token received in the second authentication request at Block 430 may be compared with the authentication token that was generated at Block 410, in order to determine whether the tokens match. If the tokens match, the authentication status is determined to be positive, while if the tokens do not match, the authentication status is determined to be negative. The authentication status determined at Block 440 may then be communicated to both the client and server machines, to either authorize the requested service (if the authentication status is positive) or decline the requested service (if the authentication status is negative).

Figure 5:
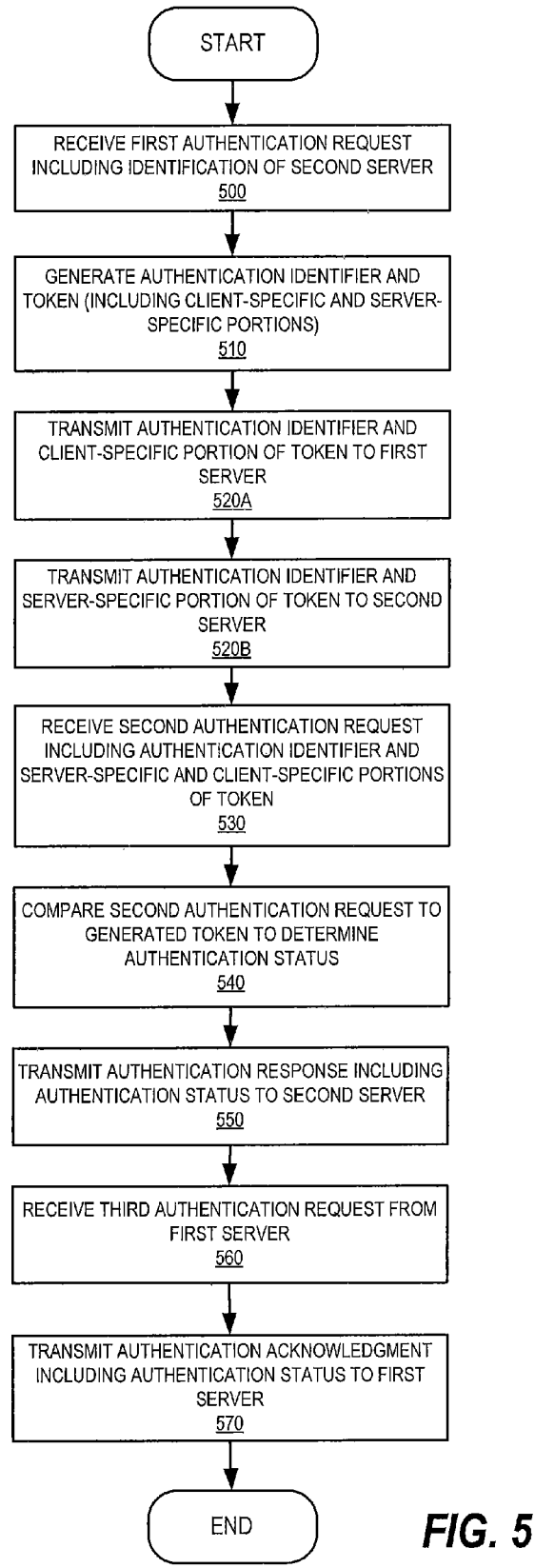

FIG. 5 is a flowchart illustrating authentication operations as described herein greater detail. Referring now to FIG. 5, operations begin at Block 500 where an initial or first authentication request is received from a first machine or server (such as client Machine 1 105 of FIGS. 1A-1B) at an authentication server (such as the authentication server 115 of FIGS. 1A-1B). As noted above, the first authentication request includes an identification of a second machine or server (such as server Machine 2 110 of FIGS. 1A-1B) that is configured to provide a service being requested by the first machine.

In response to receiving the first authentication request, an authentication identifier and a randomly encrypted authentication token are generated by the authentication server at Block 510. The authentication identifier is a unique character string corresponding or otherwise assigned to the first authentication request that was received from the first machine at Block 500. The randomly encrypted authentication token is logically divided into a client-specific portion and a server-specific portion by the authentication server.

The authentication identifier and the client-specific portion of the authentication token are transmitted to the first machine at Block 520A. The authentication identifier and the server-specific portion of the authentication token are transmitted to the second machine at Block 520B. However, the client-specific portion of the authentication token is not transmitted to the second machine, and the server-specific portion of the authentication token is not transmitted to the first machine by the authentication server. In response to the operations of Blocks 520A and 520B, a subsequent or second authentication request is received at the authentication server from the second machine at Block 530. The second authentication request includes the authentication identifier, the server-specific portion of the authentication token, and also the client-specific portion of the authentication token. As the client-specific portion of the authentication token was not transmitted to the second server, the presence of the client-specific portion of the authentication token in the second authentication request is indicative of communication between the second machine and the first machine (to which the client-specific portion of the authentication token was transmitted at Block 520A).

At Block 540, the server-specific and the client-specific portions of the authentication token received at Block 530 are compared to the authentication token generated at Block 510 to determine the authentication status for the requested service. In particular, a match between the generated authentication token (at Block 510) and the received server-specific and the client-specific portions (at Block 530) results in a positive authentication status (i.e., the authentication was successful), while the absence of a match between the generated authentication token (at Block 510) and the received server-specific and the client-specific portions (at Block 530) results in a negative authentication status (i.e., the authentication was unsuccessful).

An authentication response including the determined authentication status is transmitted from the authentication server to the second machine at Block 550. If the indicated authentication status is positive, the second machine may respond to the first machine with communications relating to the requested service. On the other hand, if the indicated authentication status is negative, the second machine may respond to the first machine with an error code. The authentication response from the authentication server may thus effectively authorize the second machine to provide the requested service to the first machine.

Another or third authentication request is received at the authentication server from the first machine at Block 560. The third authentication request includes the authentication identifier, and is received in response to transmitting the authentication response to the second server that Block 550. The third authentication request may indicate to the authentication server that the second machine has responded to the initial request for service, and that the first machine is seeking a confirmation or authorization to accept communications relating to the requested service from the second machine.

At Block 570, in response to the third authentication request, an authentication acknowledgement including the determined authentication status is transmitted from the authentication server to the first machine. If the indicated authentication status is positive, the first machine may accept and/or consume communications from the second machine in providing the requested service. If the indicated authentication status is negative, the first server may not accept communications from the second machine. The first machine (i.e., the client) may also implement audit logging with respect to the success or failure of the authentication for the requested service.

Although described above with reference to specific configurations, authentication servers in accordance with embodiments of the present disclosure may include multiple design considerations, some but not all of which are explicitly discussed above, and one or more (but not necessarily all) of which may be employed in embodiments of the present disclosure. For example, the authentication server can be configured to store random SHAs and/or random encrypted tokens, and/or may be capable of configuring M number of encryption algorithms (e.g. Triple DES, DES, etc.). The authentication server may be responsible for dividing the authentication token into the client- and server-specific portions, while the client and server machines may be responsible for updating the actions taken in response to the authentication status. The authentication server may also be configured to handle generation of a unique authentication identifier for each initial authentication request received from a client machine, and/or may be configured to encrypt the authentication identifier with symmetric key encryption. Also, the authentication server may allow for configurable token expiry. The authentication server may be configured to conduct communications with client and server machines in a point-to-point manner. The authentication server may be configured to maintain a queue or pool for incoming authentication requests. In some embodiments, the authentication server may be a web-based application. The authentication server may also include an admin module and/or provide a reporting system. Also, the authentication server may be accessed only by client and/or server machines having registered IP addresses, while communication between the authentication server and other machines may be handled by https (for example, REST or SOAP Web Services over http or https can be implemented). In some embodiments, the authentication server may be used with SSL only. Moreover, the client and server machines may be configured for communication with the authentication server via plug-ins, where the plug-in communicates the authentication requests with the authentication server.

Embodiments described herein may differ from some conventional authentication techniques in several aspects. For example, while some conventional algorithms (such as the Kerberos algorithm) may also utilize an authentication server and a secondary server (such as a ticket-generating or granting server) to authenticate a client application by a server application, such algorithms may communicate with only the client application, or with only the server application. In contrast, embodiments of the present disclosure provide a single, centralized authentication server that is configured to communicate with both the client and server machines, such that all parties are involved in the authentication, without the use of a ticket-generating server or other secondary server in the authentication process. Embodiments of the present disclosure also require an additional authentication request from the client machine (referred to herein as the third authentication request) and a corresponding response from the authentication server (referred to herein as the acknowledgment response), as an additional or final verification step. Also, while some conventional algorithms may only validate the client machine, embodiments of the present disclosure are configured to authenticate both the requesting client machine and the requested server machine. In addition, some such conventional algorithms may use authentication of the end user client, while embodiments of the present disclosure are configured to use machine-to-machine authentication. Furthermore, as embodiments of the present disclosure operate without human intervention, and thus, may differ from keystroke logging- and/or shoulder surfing-based authentication.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. As used herein, "a processor" may refer to one or more processors.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. Although some of the diagrams include arrows on communication paths to show a primary direction of communication, it is to be understood that communication may occur in the opposite direction to the depicted arrows. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" (and variants thereof) when used herein, specify the presence of stated features, integers, steps, operations, elements, and/or components, but do not preclude the presence or addition of one or more other features, integers, steps, operations, elements, components, and/or groups thereof. In contrast, the term "consisting of" (and variants thereof) when used in this specification, specifies the stated features, integers, steps, operations, elements, and/or components, and precludes additional features, integers, steps, operations, elements and/or components. Elements described as being "to" perform functions, acts and/or operations may be configured to or otherwise structured to do so. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the disclosure being set forth in the following claims.

The invention claimed is:

1. A computer-implemented authentication method, comprising:
    performing operations as follows by a processor of an authentication server:
    receiving, at the authentication server from a first machine, a first authentication request comprising an identification of a second machine that is to provide a requested service;
    generating, at the authentication server, an authentication token comprising client-specific and server-specific portions, responsive to receiving the first authentication request from the first machine;
    transmitting, from the authentication server to the second machine, an authentication identifier and the server-specific portion of the authentication token, responsive to receiving the first authentication request from the first machine, wherein the server-specific portion is not transmitted to the first machine from the authentication server;
    receiving, at the authentication server from the second machine, a second authentication request comprising the authentication identifier, the server-specific portion of the authentication token, and the client-specific portion of the authentication token;
    determining, at the authentication server, an authentication status for the requested service, responsive to receiving the second authentication request from the second machine;
    receiving, at the authentication server from the first machine, a third authentication request comprising the authentication identifier, responsive to determining the authentication status; and
    responsive to determining the authentication status and responsive to receiving the third authentication request, transmitting, from the authentication server to the first machine, an acknowledgment comprising the authentication identifier and the authentication status for the requested service, wherein the acknowledgment from the authentication server indicates whether a response for the requested service, which is received by the first machine, is authentic.

2. The computer-implemented authentication method of claim 1, wherein generating the authentication token comprises:
    generating a randomly-encrypted token; and
    dividing the randomly-encrypted token into a first part comprising the client-specific portion and a second part comprising the server-specific portion,
    wherein the client-specific portion of the authentication token is not transmitted to the second machine from the authentication server.

3. The computer-implemented authentication method of claim 2, further comprising performing operations as follows by the processor:
    transmitting, from the authentication server to the first machine, the authentication identifier and the client-specific portion of the authentication token, responsive to receiving the first authentication request,
    wherein receiving the second authentication request from the second machine is responsive to transmitting the client-specific portion of the authentication token to the first machine.

4. The computer-implemented authentication method of claim 1, further comprising performing operations as follows by the processor:
    transmitting, from the authentication server to the second machine, an authentication response comprising the authentication status responsive to determining thereof,
    wherein receiving the third authentication request from the first machine is responsive to transmitting the authentication response to the second machine.

5. The computer-implemented authentication method of claim 4, wherein determining the authentication status comprises:
    comparing the server-specific and the client-specific portions of the authentication token received from the second machine in the second authentication request with the authentication token generated at the authentication server responsive to receiving the first authentication request;
    determining the authentication status as positive responsive to a match indicated by the comparing; and
    determining the authentication status as negative responsive to an absence of the match indicated by the comparing.

6. The computer-implemented method of claim 5, wherein the acknowledgment comprising the authentication status as positive indicates authorization for the first machine to accept the response for the requested service from the second machine.

7. The computer-implemented method of claim 6, wherein the authentication response comprising the authentication status as positive indicates authorization for the second machine to provide the response for the requested service to the first machine.

8. A computer system, comprising:
    a processor; and
    a memory coupled to the processor, the memory comprising computer readable program code embodied therein that, when executed by the processor, causes the processor to perform operations comprising:
    receiving, from a first machine, a first authentication request comprising an identification of a second machine that is to provide a requested service;

generating an authentication token comprising client-specific and server-specific portions responsive to receiving the first authentication request comprising the identification of the second machine;

transmitting, to the second machine, an authentication identifier and the server-specific portion of the authentication token, responsive to receiving the first authentication request from the first machine, wherein the server-specific portion of the authentication token is not transmitted to the first machine by the processor;

receiving, from the second machine, a second authentication request comprising the authentication identifier, the server-specific portion of the authentication token, and the client-specific portion of the authentication token;

determining an authentication status for the requested service responsive to receiving the second authentication request comprising the authentication identifier, the server-specific portion of the authentication token, and the client-specific portion of the authentication token;

receiving, from the first machine, a third authentication request comprising the authentication identifier, responsive to determining the authentication status; and responsive to determining the authentication status and responsive to receiving the third authentication request, transmitting, to the first machine, an acknowledgment comprising the authentication identifier and the authentication status for the requested service, wherein the acknowledgment verifies whether a response for the requested service, which is received by the first machine, is authentic.

9. The computer system of claim 8, wherein generating the authentication token comprises:
    generating a randomly-encrypted token; and
    dividing the randomly-encrypted token into a first part comprising the client-specific portion and a second part comprising the server-specific portion,
    wherein the client-specific portion of the authentication token is not transmitted to the second machine by the processor.

10. The computer system of claim 9, wherein, when executed by the processor, the computer readable program code further causes the processor to perform operations comprising:
    transmitting, to the first machine, the authentication identifier and the client-specific portion of the authentication token, responsive to receiving the first authentication request therefrom,
    wherein receiving the second authentication request from the second machine is responsive to transmitting the client-specific portion of the authentication token to the first machine.

11. The computer system of claim 8, wherein, when executed by the processor, the computer readable program code further causes the processor to perform operations comprising:
    transmitting, to the second machine, an authentication response comprising the authentication status responsive to determining thereof,
    wherein receiving the third authentication request from the first machine is responsive to transmitting the authentication response to the second machine.

12. A computer program product comprising:
a non-transitory computer readable storage medium comprising computer readable program code embodied in the medium, which, when executed by a processor, causes the processor to perform operations comprising:

receiving, from a first machine, a first authentication request comprising an identification of a second machine that is to provide a requested service;

generating an authentication token comprising client-specific and server-specific portions responsive to receiving the first authentication request comprising the identification of the second machine;

transmitting, to the second machine, an authentication identifier and the server-specific portion of the authentication token, responsive to receiving the first authentication request from the first machine, wherein the server-specific portion of the authentication token is not transmitted to the first machine by the computer readable program code when executed by the processor;

receiving, from the second machine, a second authentication request comprising the authentication identifier, the server-specific portion of the authentication token, and the client-specific portion of the authentication token;

determining an authentication status for the requested service responsive to receiving the second authentication request comprising the authentication identifier, the server-specific portion of the authentication token, and the client-specific portion of the authentication token;

receiving, from the first machine, a third authentication request comprising the authentication identifier, responsive to determining the authentication status; and responsive to determining the authentication status and responsive to receiving the third authentication request, transmitting, to the first machine, an acknowledgment comprising the authentication identifier and the authentication status for the requested service, wherein the acknowledgment verifies whether a response for the requested service, which is received by the first machine, is authentic;

receiving, from the first machine, a third authentication request comprising the authentication identifier, responsive to determining the authentication status; and responsive to determining the authentication status and responsive to receiving the third authentication request, transmitting, to the first machine, an acknowledgment comprising the authentication identifier and the authentication status for the requested service, wherein the acknowledgment verifies whether a response for the requested service, which is received by the first machine, is authentic.

13. The computer program product of claim 12, wherein generating the authentication token comprises:
    generating a randomly-encrypted token; and
    dividing the randomly-encrypted token into a first part comprising the client-specific portion and a second part comprising the server-specific portion,
    wherein the client-specific portion of the authentication token is not transmitted to the second machine by the computer readable program code when executed by the processor.

14. The computer program product of claim 13, wherein, when executed by the processor, the computer readable program code further causes the processor to perform operations comprising:
    transmitting, to the first machine, the authentication identifier and the client-specific portion of the authentication token, responsive to receiving the first authentication request therefrom, wherein receiving the second authentication request from the second machine is responsive to transmitting the client-specific portion of the authentication token to the first machine.

15. The computer program product of claim 14, wherein, when executed by the processor, the computer readable program code further causes the processor to perform operations comprising:
   transmitting, to the second machine, an authentication response comprising the authentication status responsive to determining thereof;
   wherein receiving the third authentication request comprises receiving the third authentication request responsive to transmitting the authentication response to the second machine.

* * * * *